United States Patent
Gao

(10) Patent No.: US 12,375,700 B2
(45) Date of Patent: Jul. 29, 2025

(54) VIDEO DECODING AND DISPLAY SYSTEM AND MEMORY ACCESSING METHOD THEREOF

(71) Applicant: ALi Corporation, Hsinchu (TW)

(72) Inventor: Feng Gao, Guangdong (CN)

(73) Assignee: ALi Corporation, Hsinchu (TW)

( * ) Notice: Subject to any disclaimer, the term of this patent is extended or adjusted under 35 U.S.C. 154(b) by 484 days.

(21) Appl. No.: 17/546,069

(22) Filed: Dec. 9, 2021

(65) Prior Publication Data

US 2022/0210454 A1    Jun. 30, 2022

(30) Foreign Application Priority Data

Dec. 25, 2020  (CN) .......................... 202011560754.4

(51) Int. Cl.
| | |
|---|---|
| *H04N 19/44* | (2014.01) |
| *H04N 19/169* | (2014.01) |
| *H04N 19/172* | (2014.01) |
| *H04N 19/423* | (2014.01) |

(52) U.S. Cl.
CPC .......... *H04N 19/44* (2014.11); *H04N 19/172* (2014.11); *H04N 19/1883* (2014.11); *H04N 19/423* (2014.11)

(58) Field of Classification Search
None
See application file for complete search history.

(56) References Cited

U.S. PATENT DOCUMENTS

| | | | |
|---|---|---|---|
| 10,075,722 B1* | 9/2018 | Cheng | H04N 19/423 |
| 2016/0156937 A1* | 6/2016 | Yang | H04N 19/176 |
| | | | 375/240.16 |
| 2017/0301056 A1* | 10/2017 | Nishida | G06T 1/0007 |
| 2018/0089000 A1* | 3/2018 | Ryu | H04N 19/127 |
| 2018/0091827 A1* | 3/2018 | Chou | H04N 19/174 |

(Continued)

FOREIGN PATENT DOCUMENTS

| | | |
|---|---|---|
| CN | 1863282 | 11/2006 |
| CN | 101127896 | 2/2008 |
| CN | 106569727 | 4/2017 |

(Continued)

OTHER PUBLICATIONS

"Office Action of China Counterpart Application", issued on Aug. 30, 2023, p. 1-p. 7.

*Primary Examiner* — Stuart D Bennett
(74) *Attorney, Agent, or Firm* — JCIPRNET

(57) ABSTRACT

A video decoding and display system and a memory accessing method thereof are provided. The video decoding and display system includes a plurality of memories, a plurality of display processing cores, a plurality of decoding processing cores, and a mapping circuit. The memories are configured to record a plurality of frame segments of a vide frame. The decoding processing cores decode the frame segments in parallel. The mapping circuit is coupled between the decoding processing cores and the memories. Each of the memories correspondingly records one of the frame segments. Each of the display processing cores correspondingly accesses one of the memories. Each of the decoding processing cores accesses the memories through the mapping circuit, and the decoding processing cores access one of the memories in order.

12 Claims, 7 Drawing Sheets

(56) References Cited

U.S. PATENT DOCUMENTS

2019/0065387 A1\* 2/2019 Duzly ................ G06F 12/0246

FOREIGN PATENT DOCUMENTS

| CN | 106921862 | 7/2017 |
| CN | 107391431 | 11/2017 |
| CN | 108848384 | 11/2018 |
| JP | H06276508 | 9/1994 |
| JP | 2008072336 | 3/2008 |

\* cited by examiner

VIDEO DECODING AND DISPLAY SYSTEM AND MEMORY ACCESSING METHOD THEREOF

CROSS-REFERENCE TO RELATED APPLICATION

This application claims the priority benefit of China application serial no. 202011560754.4, filed on Dec. 25, 2020. The entirety of the above-mentioned patent application is hereby incorporated by reference herein and made a part of this specification.

BACKGROUND

Technical Field

The disclosure relates to a video decoding technology, and more particularly, to a video decoding and display system and a memory accessing method thereof.

Description of Related Art

With the development and dissemination of hardware that can reproduce and store high-resolution or high-definition video content, there is an increasing demand for a video codec that efficiently encodes or decodes high-resolution or high-definition video content. To meet such demand, the video coding experts group (VCEG) of the international telecommunication union (ITU-T) and the moving picture experts group (MPEG) of the international standard organization (ISO)/international electrotechnical commission (IEC) collectively developed an H.265/high efficiency video coding (HEVC) project, aiming to provide coding efficiency higher than that of an H.264/advanced video coding (AVC) video compression standard.

In addition, with the advancement of the display technology, various image playback devices have become much larger in size, and the requirements for image quality have also become higher. For example, display devices with ultra-high image quality (UHD) resolution (such as 4K, 8K resolution) have gradually become common. Correspondingly, when the size or the resolution of the playback image is increased, the processing capability of the video decoder that applies various video compression standards needs to be improved to be able to handle, in a real-time manner, 60 frames per second (60 fps) or a higher frame rate. Currently, it has been proposed that the decoding performance may be improved through the parallel processing of a multi-core processing architecture. To avoid insufficient memory bandwidth of the memory, memories may be disposed in correspondence with the respective processing cores to increase the memory bandwidth. Currently, it has been proposed to connect the processing cores and the memories to a system bus and access data through the system bus. However, such configuration may significantly increase the consumption of system bandwidth and bring a considerable burden on the system bus. In addition, in a design with multiple memories, if the memory bandwidths of the memories cannot be used efficiently and evenly, the performance of image decoding and image display processing may also be degraded.

SUMMARY

In view of this, the disclosure provides a video decoding and display system and a memory accessing method thereof, which may avoid overloading a system bus and use memory bandwidths of multiple memories evenly.

An embodiment of the disclosure provides a video decoding and display system, which includes multiple memories, multiple display processing cores, multiple decoding processing cores, and a mapping circuit. The memories are configured to record multiple frame segments of a video frame. The decoding processing cores decode the frame segments in parallel. The mapping circuit is coupled between the decoding processing cores and the memories. Each of the memories correspondingly records one of the frame segments, and each of the display processing cores correspondingly accesses one of the memories. Each of the decoding processing cores accesses the memories through the mapping circuit when decoding the video frame, and the decoding processing cores access one of the memories in order.

From another point of view, an embodiment of the disclosure provides a memory accessing method of a video decoding and display system. The memory accessing method includes the following steps. When multiple decoding processing cores decode a video frame in parallel, multiple memories are accessed through a mapping circuit by each of the decoding processing cores. One of the memories is accessed in order by the decoding processing cores. When the display processing cores perform image processing on the video frame, one of the memories is correspondingly accessed by each of the display processing cores. The memories are configured to record multiple frame segments of the video frame, and each of the memories correspondingly records one of the frame segments.

Based on the above, in the embodiment of the disclosure, the decoding processing cores and the display processing cores do not access the memories through the system bus, so the burden of the system bus and the complexity of arbitration may be reduced. In addition, when decoding the video frame, each of the decoding processing cores decodes the corresponding frame segment of the video frame in parallel. These decoding processing cores are activated in order and may start accessing the memories in order through the mapping circuit, so as to reduce the probability of the decoding processing cores accessing the same memory simultaneously. In this way, the memory bandwidths of these memories may be used efficiently and evenly to facilitate the performance of the video decoding and display system.

In order for the above features and advantages of the disclosure to be more comprehensible, embodiments accompanied with drawings are described in detail below.

DETAILED DESCRIPTION OF DISCLOSED EMBODIMENTS

Figure 1:
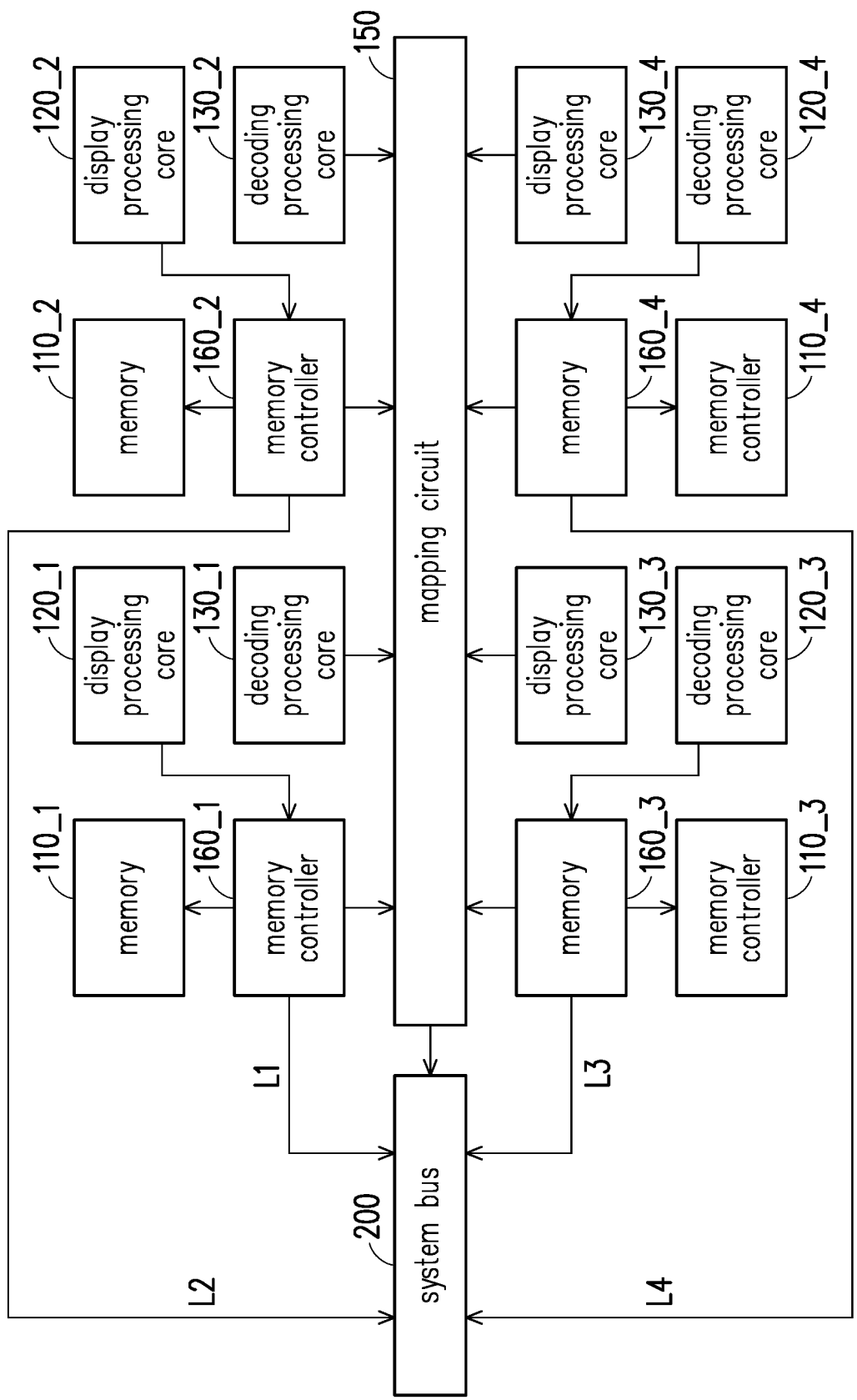
FIG. 1 is a schematic view of a video decoding and display system according to an embodiment of the disclosure.

Now referring to exemplary embodiments in detail, examples of the exemplary embodiments are illustrated in the accompanying drawings. In addition, wherever possible, elements/components with the same reference numerals in the drawings and embodiments represent the same or similar parts.

It should be understood that although the terms "first" and "second" may be configured herein to describe various elements/data, these elements should not be limited by these terms. These terms are only configured to distinguish one element/data from another element/data.

FIG. 1 is a schematic view of a video decoding and display system according to an embodiment of the disclosure. Referring to FIG. 1, a video decoding and display system 10 may apply the HEVC standard, the AVS2 standard or other similar video coding and decoding standards. The disclosure is not particularly limited in this regard. A video coding device (not shown) may divide each video frame in a video into multiple rows and multiple columns of coding tree units (CTUs) not overlapping each other for compression coding according to the video compression standards. The video decoding and display system 10 may obtain a code stream of multiple video frames generated by coding according to the video compression standards, and decode the code stream according to the video compression standards to reconstruct the video frames of the video. In addition, the video decoding and display system 10 may also perform image processing, such as removing noise, adjusting chromatic aberrations, increasing sharpness, or adjusting image size, etc., on the video frame generated through decoding, so that a display device (not shown) may display the video frame after the image processing.

Herein, the video decoding and display system 10 may be implemented by an integrated circuit. The video decoding and display system 10 includes multiple memories 110_1 to 110_4, multiple display processing cores 120_1 to 120_4, multiple decoding processing cores 130_1 to 130_4, and a mapping circuit 150. In an embodiment, the number of the decoding processing cores 130_1 to 130_4 is the same as the number of the display processing cores 120_1 to 120_4, and the number of the memories 110_1 to 110_4 is equal to the number of the decoding processing cores 130_1 to 130_4. For the ease and clarity of description, the following embodiment is described with an example having four memories 110_1 to 110_4, four display processing cores 120_1 to 120_4, and four decoding processing cores 130_1 to 130_4. However, the disclosure is not limited thereto.

The memories 110_1 to 110_4 are internal memories such as dynamic random access memories (DRAMs) or synchronization dynamic random access memories (SDRAMs), etc., which are configured to temporarily store the video frame when video decoding is performed. In addition, the memories 110_1 to 110_4 may be single-channel dynamic random access memories or dual-channel dynamic random access memories. The disclosure is not limited thereto. In addition, in an embodiment, one video frame is divided into multiple frame segments, so that the decoding processing cores 130_1 to 130_4 may decode the frame segments in parallel, and the display processing core 120_1 to 120_4 may perform image processing on the frame segments in parallel. The memories 110_1 to 110_4 are configured to record the frame segments of the video frame. More specifically, each of the memories 110_1 to 110_4 correspondingly records one of the frame segments. That is, the memories 110_1 to 110_4 respectively record different frame segments of the video frame.

Figure 2:
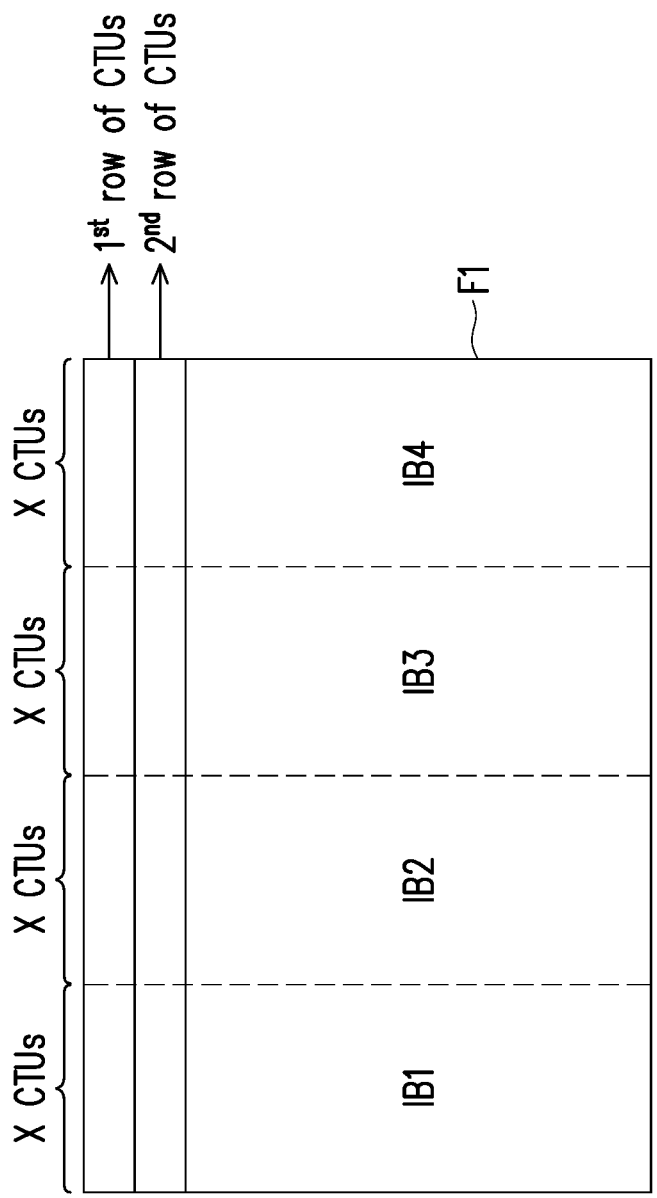
FIG. 2 is a schematic view of a frame segment according to an embodiment of the disclosure.

FIG. 2 is a schematic view of multiple frame segments according to an embodiment of the disclosure. Referring to FIG. 2, a video frame F1 may be vertically divided into four frame segments IB1 to IB4. Data of each of the frame segments IB1 to IB4 is recorded in one of the corresponding memories 110_1 to 110_4. For example, the memory 110_1 may be configured to record the data of the frame segment IB1, while the memory 110_2 may be configured to record the data of the frame segments IB2, and so on. Each of the frame segments IB1 to IB4 includes X columns of and Y rows of CTUs. In an embodiment, Y may be the total number of rows of CTUs in the video frame, and X may be ¼ of the total number of CTUs in one row. In other words, each of the frame segments IB1 to IB4 includes X CTUs that do not overlap in each row of CTUs in the video frame F1.

Returning to FIG. 1, in an embodiment, the video decoding and display system 10 further includes multiple memory controllers 160_1 to 160_4. The memory controllers 160_1 to 160_4 may be, for example, implemented by multiple dynamic memory controllers (DMCs). Each of the memory controllers 160_1 to 160_4 is correspondingly coupled to one of the memories 110_1 to 110_4. For example, the memory controller 160_1 is correspondingly coupled to the memory 110_1, while the memory controller 160_2 is correspondingly coupled to the memory 110_2, and so on. In an embodiment, the display processing cores 120_1 to 120_4 and the decoding processing cores 130_1 to 130_4 need to access the memories 110_1 to 110_4 through the memory controllers 160_1 to 160_4. Particularly, in an embodiment, each of the memory controllers 160_1 to 160_4 may be connected to a system bus 200 through signal transmission circuits L1 to L4, so that other circuit modules (for example, a central processing unit (CPU) or a graphics processing unit (GPU), etc.) may also access the memories 110_1 to 110_4 through the system bus 200.

The display processing cores 120_1 to 120_4 are configured to perform image processing, such as removing noise, adjusting chromatic aberration, increasing sharpness, or adjusting image size, etc., on the video frame generated through decoding. The display processing cores 120_1 to 120_4 are configured to perform image processing on the frame segments of the video frame in parallel. In other words, different frame segments may be respectively processed by different display processing cores 120_1 to 120_4.

The decoding processing cores 130_1 to 130_4 may perform a decoding operation, for example, including decoding processes such as de-quantization processing, inverse transformation processing, intra prediction, inter prediction, loop filtering, etc. In another embodiment, the decoding processing cores 130_1 to 130_4 may also perform entropy decoding and variable length coding and decoding to restore and rearrange data. The decoding processing cores 130_1 to 130_4 decode the CTUs scattered in the frame segments in parallel and cyclically. That is, the data of each of the frame segments is collectively decoded by the decoding processing cores 130_1 to 130_4. In addition, within the same time, the decoding processing cores 130_1 to 130_4 operating in parallel are respectively responsible for processing different frame segments. The details will be described later.

The mapping circuit 150 is coupled between the decoding processing cores 130_1 to 130_4 and the memories 110_1 to 110_4. When the decoding processing cores 130_1 to 130_4 request to access the memories 110_1 to 110_4, the mapping circuit 150 may send an accessing request issued by the decoding processing cores 130_1 to 130_4 to the corresponding memory controllers 160_1 to 160_4. When the decoding processing cores 130_1 to 130_4 request to access the same memory, the mapping circuit 150 performs an arbitration.

Particularly, in the embodiment of the disclosure, each of the display processing cores 120_1 to 120_4 correspondingly accesses one of the memories 110_1 to 110_4. In detail, the display processing core 120_1 is disposed to access the memory 110_1 to obtain a first frame segment of the video frame from the memory 110_1. The display processing core 120_2 is disposed to access the memory 110_2 to obtain a second frame segment of the video frame from the memory 110_2. The display processing core 120_3 is disposed to access the memory 110_3 to obtain a third frame segment of the video frame from the memory 110_3. The display processing core 120_4 is disposed to access the memory 110_4 to obtain a fourth frame segment of the video frame from the memory 110_4.

On the other hand, each of the decoding processing cores 130_1 to 130_4 accesses the memories 110_1 to 110_4 through the mapping circuit 150 when decoding the video frame, and the decoding processing cores 130_1 to 130_4 access one of the memories 110_1 to 110_4 in order. Specifically, the decoding processing core 130_1 accesses the memories 110_1 to 110_4 in order through the mapping circuit 150 to successively read and decode the first to the last CTUs of the same row of CTUs in the frame segments. Similarly, the remained decoding processing cores 130_2 to 130_4 also respectively access the memories 110_1 to 110_4 in order through the mapping circuit 150 to decode the data in the frame segments. Particularly, although each of the decoding processing cores 130_1 to 130_4 accesses the memories 110_1 to 110_4 one by one, the decoding processing cores 130_1 to 130_4 are activated in order at different time points to start accessing the memories 110_1 to 110_4 one by one. More specifically, when each of the decoding processing cores 130_1 to 130_4 decodes a certain row of CTUs, each of the decoding processing cores 130_1 to 130_4 starts decoding from the first CTU in the row and decodes until the last CTU in the row. Therefore, when each of the decoding processing cores 130_1 to 130_4 is ready to decode a certain row of CTUs, each of the decoding processing cores 130_1 to 130_4 may first access the memory 110_1 which stores the first CTU of each row of CTUs, and then continue to successively access the memories 110_2 to 110_4 as the decoding progresses. However, the decoding processing cores 130_1 to 130_4 are not activated simultaneously but activated in order at different time points to access the memory 110_1, so as to decode the rows of CTUs of the video frame. In this way, since the decoding processing cores 130_1 to 130_4 are activated in order so as to start decoding the frame segments, the time periods during which the decoding processing cores 130_1 to 130_4 access the same memory may be substantially staggered, so that the decoding processing cores 130_1 to 130_4 may access different memories in the same time period as much as possible. In this way, when the decoding processing cores 130_1 to 130_4 decode in parallel, memory bandwidths of these memories 110_1 to 110_4 may be used efficiently and evenly, so as to facilitate the performance of the video decoding and display system 10.

Hereinafter, implementation details of the decoding processing cores 130_1 to 130_4 accessing the memories 110_1 to 110_4 are described.

In an embodiment, the decoding processing cores may include a first decoding processing core and a second decoding processing core. In other words, the first decoding processing core and the second decoding processing core are two of the decoding processing cores 130_1 to 130_4. When the decoding processing cores 130_1 to 130_4 decode the video frame, the first decoding processing core and the second decoding processing core access the memories 110_1 to 110_4 in order through the memory controllers 160_1 to 160_4. The first decoding processing core accesses one of the memories 110_1 to 110_4 during a first period, and the second decoding processing core accesses another one of the memories 110_1 to 110_4 during the first period. In other words, the first decoding processing core and the second decoding processing core access different memories during the first period. The first decoding processing core accesses one of the memories 110_1 to 110_4 (for example, the memory 110_2) to decode the CTUs belonging to the $i^{th}$ row of CTUs (for example, the first row) in one of the frame segments. At the same time, the second decoding processing core accesses another one of the memories 110_1 to 110_4 (for example, the memory 110_1) to decode the CTUs belonging to the $(i+1)^{th}$ row of CTUs (for example, the second row) in another one of the frame segments.

In an embodiment, when the first decoding processing core accesses one of the memories 110_1 to 110_4 to decode the CTUs belonging to the $i^{th}$ row of CTUs in one of the frame segments, the mapping circuit 150 may send an accessing request of the first decoding processing core to one of the memory controllers 160_1 to 160_4 according to a memory identifier included in the accessing request of the first decoding processing core. When the second decoding processing core accesses another one of the memories to decode the CTUs belonging to the $(i+1)^{th}$ row of CTUs in another one of the frame segments, the mapping circuit 150 sends an accessing request of the second decoding processing core to the another one of the memory controllers 160_1 to 160_4 according to a memory identifier included in the accessing request of the second decoding processing core. In an embodiment, when the first decoding processing core and the second decoding processing core simultaneously access the same memory among the memories 110_1 to 110_4 during a second period, the mapping circuit 150 arbitrates the accessing request of the first decoding processing core and the accessing request of the second decoding processing core.

Figure 3:
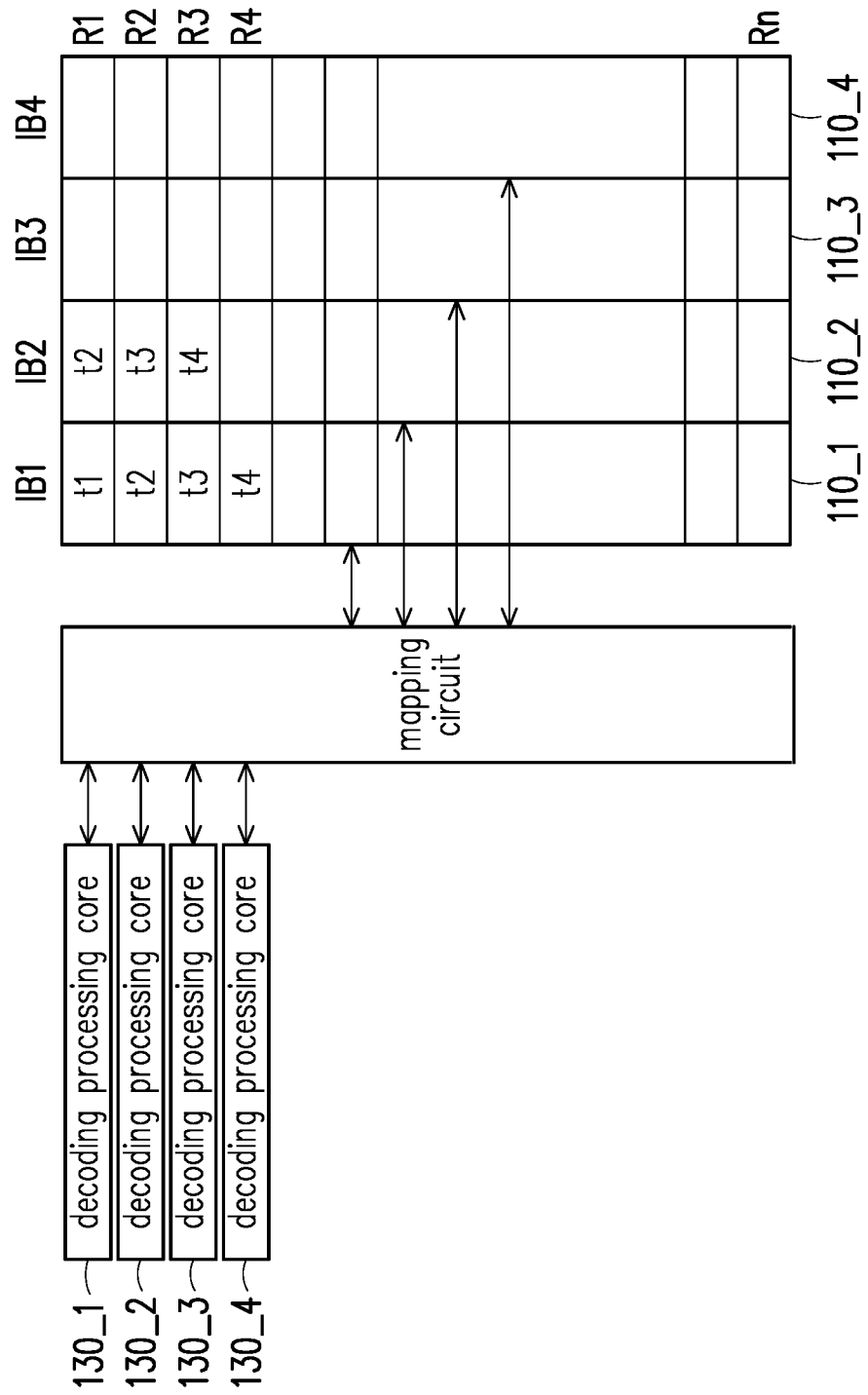
FIG. 3 is a schematic view of a decoding processing core accessing multiple memories according to an embodiment of the disclosure.

FIG. 3 is a schematic view of a decoding processing core accessing multiple memories according to an embodiment of the disclosure. Referring to FIG. 3, a video frame is vertically divided into frame segments IB1 to IB4. It is assumed that the memory 110_1 is configured to record the frame segment IB1, and the memory 110_2 is configured to record the frame segment IB2, while the memory 110_3 is configured to record the frame segment IB3, and the memory 110_4 is configured to record the frame segment IB4.

In this embodiment, each of the rows of CTUs includes 4X CTUs. The frame segment IB1 includes the first CTU to the $X^{th}$ CTU in each of the rows R1 to Rn of CTUs. The frame segment IB2 includes the $(X+1)^{th}$ CTU to the $2X^{th}$ CTU in each of the rows R1 to Rn of CTUs. The frame segment IB3 includes the $(2X+1)^{th}$ CTU to the $3X^{th}$ CTU in each of the rows R1 to Rn of CTUs. The frame segment IB4 includes the $(3X+1)^{th}$ CTU to the $4X^{th}$ CTU in each of the rows R1 to Rn of CTUs.

The decoding processing core 130_1 is responsible for decoding the $(1+4*k)^{th}$ row of CTUs, such as the first, fifth, and ninth rows of CTUs, etc. The decoding processing core 130_2 is responsible for decoding the $(2+4*k)^{th}$ row of CTUs, such as the second, sixth, and tenth rows of CTUs, etc. The decoding processing core 130_3 is responsible for decoding the $(3+4*k)^{th}$ row of CTUs, such as the third, seventh, and eleventh rows of CTUs, etc. The decoding processing core 130_4 is responsible for decoding the $(4+4*k)^{th}$ row of CTUs, such as the fourth, eighth, and twelfth rows of CTUs, etc. k is an integer between 0 and a natural number, and the natural number depends on the resolution of the video frame. When the decoding processing cores 130_1 to 130_4 decode the video frame, each of the decoding processing cores 130_1 to 130_4 may decode different frame segments IB1 to IB4 in order, so that each of the decoding processing cores 130_1 to 130_4 accesses the memories 110_1 to 110_4 in order through the memory controllers 160_1 to 160_4. For example, the decoding processing core 130_1 may access one by one from the memory 110_1 to the memory 110_4 as the decoding of a certain row of CTUs progresses. However, in particular, the decoding processing cores 130_1 to 130_4 are activated to perform the decoding operation at different timings.

Figure 4:
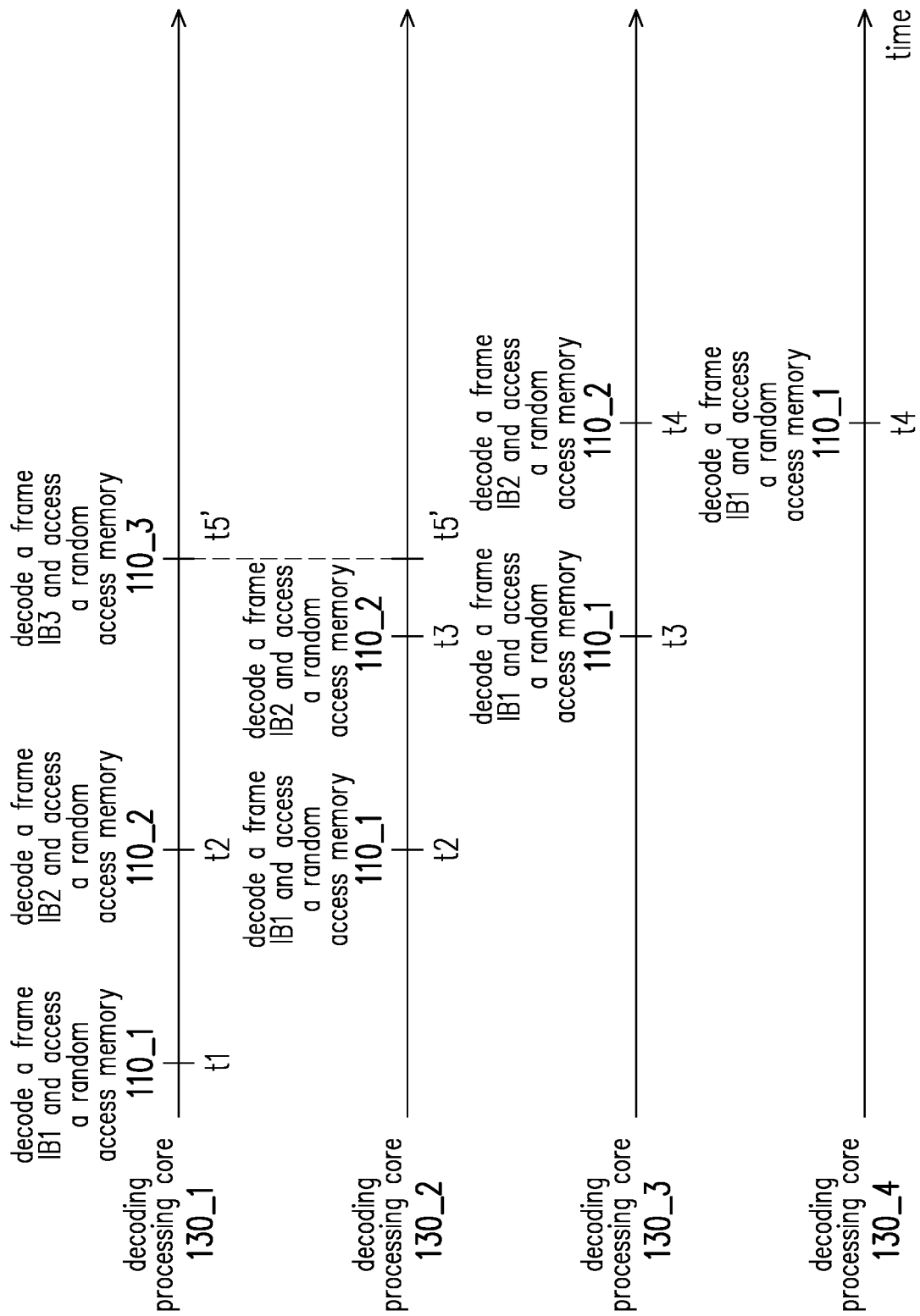
FIG. 4 is a timing diagram of a decoding processing core accessing multiple memories according to an embodiment of the disclosure.

In detail, FIG. 4 is a timing diagram of a decoding processing core accessing multiple memories according to an embodiment of the disclosure. Referring to FIGS. 3 and 4 together, the decoding processing core 130_1 starts accessing the memory 110_1 at a time point t1 to decode the first CTU to the $X^{th}$ CTU belonging to the first row R1 of CTUs in the frame segment IB1. After that, it is assumed that decoding the first CTU to the $X^{th}$ CTU is completed at a time point t2. The decoding processing core 130_1 then accesses the memory 110_2 to continue to decode the $(X+1)^{th}$ CTU to the $2X^{th}$ CTU belonging to the first row R1 of CTUs in the frame segment IB2. The rest may be deduced by analogy that after the $2X^{th}$ CTU of the first row of CTUs R1 is decoded, the decoding processing core 130_1 accesses the memories 110_3 and 110_4 in order, so as to decode the $(2X+1)^{th}$ CTU to the last CTU of the first row R1 of CTUs. In addition, after the decoding processing core 130_1 starts decoding, in response to the decoding processing core 130_1 completing the decoding of the preset number of the CTUs, the next decoding processing core 130_2 may be activated to start accessing the memory 110_1 corresponding to the frame segment IB1. The preset number in this embodiment is, for example, X. That is, after the time point t2, the decoding processing core 130_2 may start decoding the first CTU to the $X^{th}$ CTU belonging to the second row R2 of CTUs in the frame segment IB1. It may be seen that the decoding processing core 130_1 accesses the memory 110_2 in a certain period after the time point t2, and the decoding processing core 130_2 simultaneously accesses the memory 110_1 in the certain period after the time point t2.

Similarly, it is assumed that the decoding processing core 130_2 completes the decoding of the first CTU to the $X^{th}$ CTU of the second row R2 of CTUs at a time point t3. The decoding processing core 130_2 then starts accessing the memory 110_2 corresponding to the frame segment IB2 to continue to decode the $(X+1)^{th}$ CTU and the subsequent CTUs belonging to the second row R2 of CTUs in the frame segment IB2. In addition, in response to the decoding processing core 130_2 completing the decoding of the preset number of the CTUs, that is, X, belonging to the second row R2 of CTUs in the frame segment IB1 at the time point t3, the next decoding processing core 130_3 is then activated and starts accessing the memory 110_1 corresponding to the frame segment IB1 to decode the first CTU to the $X^{th}$ CTU belonging to the third row R3 of CTUs in the frame segment IB1. It may be seen that the decoding processing core 130_2 accesses the memory 110_2 in a certain period after the time point t3, and the decoding processing core 130_3 simultaneously accesses the memory 110_1 in the certain period after the time point t3.

Similarly, it is assumed that after the decoding processing core 130_3 is activated, it completes to decode the first CTU to the $X^{th}$ CTU of the third row R3 of CTUs at a time point t4, and starts accessing the memory 110_2 corresponding to the frame segment IB2 to decode the $(X+1)^{th}$ CTU and the subsequent CTUs belonging to the third row R3 of CTUs in the frame segment IB2. In addition, in response to the decoding processing core 130_3 completing the decoding of the CTUs belonging to the third row R3 of CTUs in the frame segment IB1 at the time point t4, the next decoding processing core 130_4 is activated and starts accessing the memory 110_1 corresponding to the frame segment IB1 to decode the first CTU to the $X^{th}$ CTU belonging to the fourth row R4 of CTUs in the frame segment IB1. It may be seen that the decoding processing core 130_3 accesses the memory 110_2 in the certain period after the time point t3, and the decoding processing core 130_4 simultaneously accesses the memory 110_1 in a certain period after the time point t4.

Based on the above, the decoding processing cores 130_1 to 130_4 are respectively activated one by one in order at different time points t1, t2, t3, and t4, so as to start decoding the first row R1 of CTUs to the fourth row R4 of CTUs in order at different time points respectively. The decoding processing cores 130_1 to 130_4 may be activated in response to the CTUs of the previous row of being decoded to a certain horizontal position. In an embodiment, whether the decoding processing cores 130_1 to 130_4 are activated or not may be controlled by a decoding controller (not shown). In this way, during most of the operations of decoding the video frame, the decoding processing cores 130_1 to 130_4 may respectively decode different frame segments IB1 to IB4 and access different memories 110_1 to 110_4.

Furthermore, after the decoding processing core 130_4 of this embodiment completes the decoding of the first X CTUs of the fourth row R4 of CTUs, if the decoding processing core 130_1 has completed the decoding of all the CTUs of the first row R1 of CTUs at this time, the decoding processing core 130_1 may, in response to the preset number of CTUs in the fourth row of CTUs being decoded, access the memory 110_1 again, so as to decode the first CTU to the $X^{th}$ CTU belonging to the fifth row of CTUs in the frame segment IB1. Similarly, if the decoding processing core 130_2 has completed the decoding of all the CTUs in the second row R2 of CTUs, in response to the decoding processing core 130_1 completing the decoding of the preset number of the CTUs in the fifth row of CTUs, the decoding processing core 130_2 may access the memory 110_1 again, so as to decode the first CTU to the $X^{11'}$ CTU belonging to the sixth row of CTUs in the frame segment IB1. The rest may be deduced by analogy that the decoding processing cores 130_1 to 130_4 may be activated at different times in response to the CTUs of the correspondingly previous row of CTUs being decoded to a certain horizontal position to successively start decoding each row of the CTUs until the decoding of the last row Rn of CTUs is completed.

In most cases, the complexity of each of the CTUs in the same video frame is similar, so the speed and time for each of the decoding processing core 130_1 to 130_4 to complete the decoding of the CTUs of the frame segments IB1 to IB4 are also similar. In other words, according to this embodiment, since each of the decoding processing cores waits for the previous decoding processing core to decode the first $X^{th}$ CTUs of the previous row of CTUs (that is, a width of the frame segment) before being activated, in most cases, the decoding progresses of two adjacent rows of CTUs maintain a gap of one frame segment on average therebetween, so that the decoding processing cores 130_1 to 130_4 may respectively decode different frame segments IB1 to IB4 and access different memories 110_1 to 110_4. In another embodiment, the preset number is Z CTUs, where Z is a positive integer greater than X and may be less than 2X.

In addition, although the decoding processing cores 130_1 to 130_4 are activated in order so as to perform the decoding operation, there may still be a few cases where two of the decoding processing cores 130_1 to 130_4 access the same memory. As shown in the example of FIG. 4, when the decoding processing core 130_2 has completed the access to the memory 110_1 at the time point t3 and is ready to start accessing the memory 110_2 at the time point t3, the decoding processing core 130_1 may not have completed the access to the memory 110_2 at the time point t3 due to higher complexity of decoding the $(X+1)^{th}$ CTU to the $2X^{th}$ CTU, or the decoding processing core 130_1 has started decoding the $(2x+1)^{th}$ CTU in the frame segment IB3, but still needs to refer to some data of the $2X^{th}$ CTU to continue to access the memory 110_2. If the decoding processing core 130_1 cannot complete the access to the memory 110_2 until a time point t5', a situation in which the decoding processing core 130_2 and the decoding processing core 130_1 simultaneously request to access the memory 110_2 may occur in the period between the time point t3 and the time point t5'. Correspondingly, when the mapping circuit 150 receives two accessing requests corresponding to the memory 110_2 from the decoding processing cores 130_2 and 130_1, the mapping circuit 150 arbitrates the accessing request of the decoding processing core 130_1 and the accessing request of the decoding processing core 130_2. The arbitration may be, for example, a priority ordering of the accessing requests, for example, polling priority, fixed priority, or weighted priority, etc. The disclosure is not limited thereto.

Figure 5:
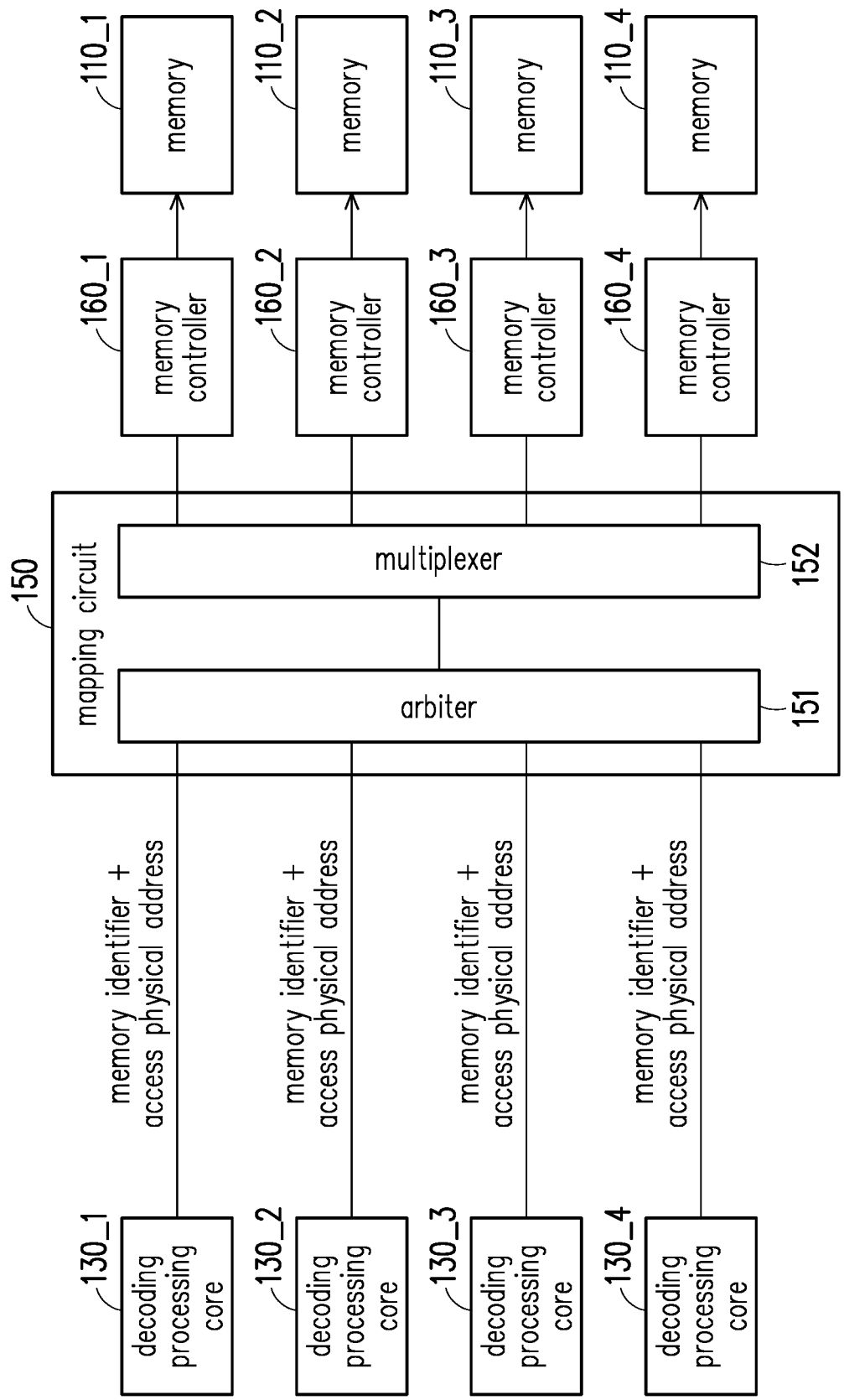
FIG. 5 is a schematic view of a mapping circuit according to an embodiment of the disclosure.

FIG. 5 is a schematic view of a mapping circuit according to an embodiment of the disclosure. Referring to FIG. 5, the mapping circuit 150 may include an arbiter 151 and a multiplexer 152. The arbiter 151 is coupled between the decoding processing cores 130_1 to 130_4 and the multiplexer 152. The multiplexer 152 is coupled between the arbiter 151 and the memory controllers 160_1 to 160_4. In an embodiment, the decoding processing cores 130_1 to 130_4 may issue an accessing request including a memory identifier and an access physical address. The memory identifier may include one or more bits to indicate a destination memory of the accessing request. For example, the memories 110_1 to 110_4 may respectively correspond to the memory identifiers '0', '01', '10', and '11'. When the decoding processing cores 130_1 to 130_4 access the memory 110_1, the decoding processing cores 130_1 to 130_4 may issue an accessing request including the memory identifier '00', and so on. In this way, the multiplexer 152 may send the accessing request to the corresponding memory controllers 160_1 to 160_4 according to the memory identifier in the accessing request, so that the memory controllers 160_1 to 160_4 may access the memories 110_1 to 110_4 according to the access physical address in the accessing request.

For example, when the decoding processing core 130_1 accesses the memory 110_4 to decode the CTUs belonging to the $i^{th}$ row of CTUs in the fourth frame segment, the mapping circuit 150 may send the accessing request of the decoding processing core 130_1 to the memory controller 160_4 according to the memory identifier "11" of the accessing request of the decoding processing core 130_1. When the decoding processing core 130_2 accesses the memory 110_3 to decode the CTUs belonging to the $(i+1)^{th}$ row of CTUs in the third frame segment, the mapping circuit 150 sends the accessing request of the decoding processing core 130_2 to the memory controller 160_3 according to the memory identifier "10" of the accessing request of the decoding processing core 130_2. When the decoding processing core 130_3 accesses the memory 110_2 to decode the CTUs belonging to the $(i+2)^{th}$ row of CTUs in the second frame segment, the mapping circuit 150 sends the accessing request of the decoding processing core 130_3 to the memory controller 160_2 according to the memory identifier "01" of the accessing request of the decoding processing core 130_3. When the decoding processing core 130_4 accesses the memory 110_1 to decode the CTUs belonging to the $(i+3)^{th}$ row of CTUs in the first frame segment, the mapping circuit 150 sends the accessing request of the decoding processing core 130_4 to the memory controller 160_1 according to the memory identifier "00" of the accessing request of the decoding processing core 130_4.

Although the decoding processing cores 130_1 to 130_4 are activated in order, to perform the decoding operation, there are still a few cases where two of the decoding processing cores 130_1 to 130_4 access the same memory. For example, when the decoding processing core 130_2 has completed the access to the memory 110_1 and is ready to start accessing the memory 110_2, the decoding processing core 130_1 has not completed the access to the memory 110_2 yet. At this time, it may occur that the decoding processing core 130_2 and the decoding processing core 130_1 simultaneously issue accessing requests with the same memory identifier "01". In an embodiment, when two of the decoding processing cores 130_1 to 130_4 simultaneously access the same memory within a certain period, the arbiter 151 of the mapping circuit 150 may choose to preferentially accept one of the two accessing requests and postpone the other one of the two accessing requests according to a preset arbitration rule.

After reading and decoding the data from the memories 110_1 to 110_4, the decoding processing cores 130_1 to 130_4 may write the decoded frame data back to the corresponding memories 110_1 to 110_4. The display processing cores 120_1 to 120_4 may access the memories 110_1 to 110_4 to process the frame data decoded by the decoding processing cores. Hereinafter, implementation details of the display processing cores 120_1 to 120_4 accessing the memories 110_1 to 110_4 are described.

In an embodiment, the display processing cores 120_1 to 120_4 include a first display processing core and a second display processing core. The first display processing core and the second display processing core are two of the display processing cores 120_1 to 120_4. When the display processing cores 120_1 to 120_4 perform image processing on the video frame, the first display processing core accesses one of the memories through one of the memory controllers, and the second display processing core accesses another one of the memories through another one of the memory controllers.

Figure 6:
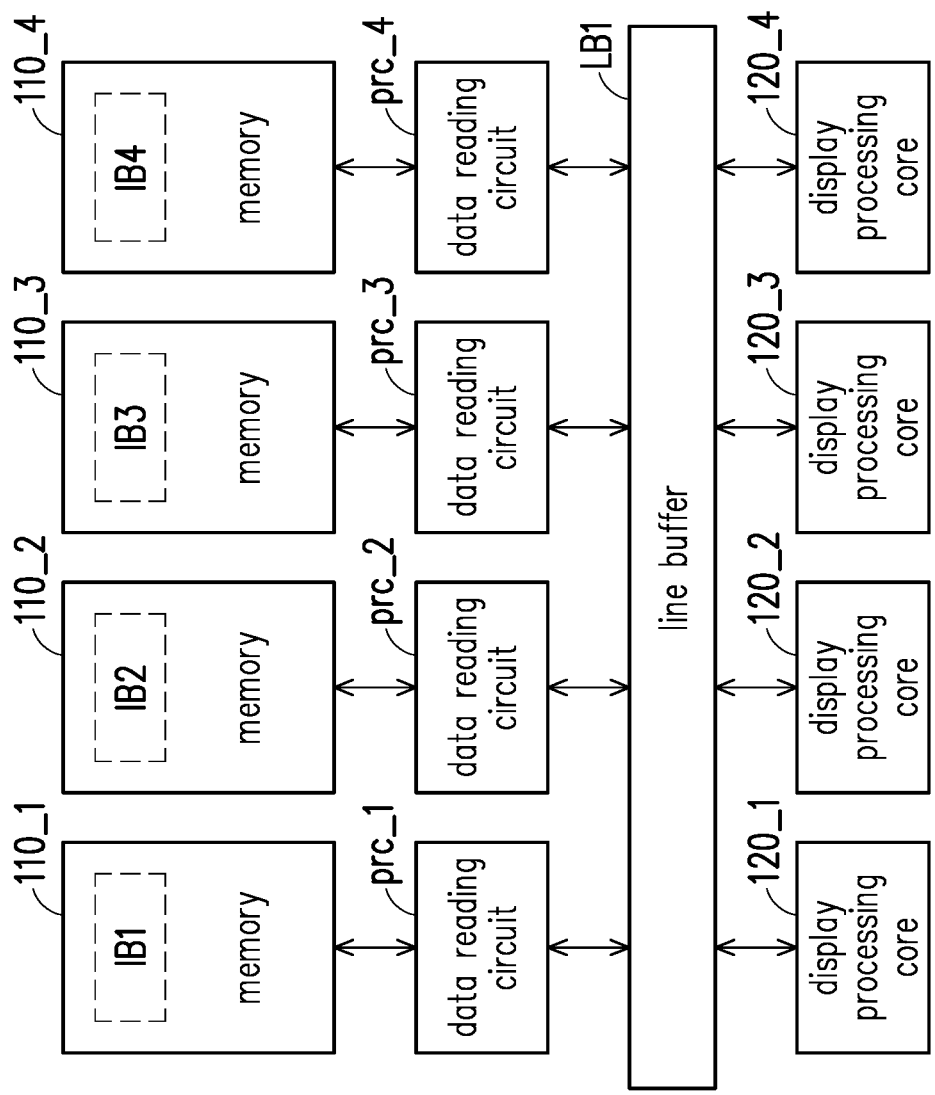
FIG. 6 is a schematic view of a display processing core accessing multiple memories according to an embodiment of the disclosure.

FIG. 6 is a schematic view of a display processing core accessing multiple memories according to an embodiment of the disclosure. Referring to FIG. 6, the video decoding and display system 10 may further include a line buffer LB1 coupled to the display processing cores 120_1 to 120_4 and multiple data reading circuits prc_1 to prc_4 respectively coupled to the display processing cores 120_1 to 120_4. The memories 110_1 to 110_4 are configured to record different frame segments IB1 to IB4 of the video frame.

When the display processing cores 120_1 to 120_4 perform image processing on the video frame, the display processing core 120_1 only accesses the memory 110_1 through the memory controller 160_1. The display processing core 120_2 only accesses the memory 110_1 through the memory controller 160_2. The display processing core 120_3 only accesses the memory 110_3 through the memory controller 160_3. The display processing core 120_4 only accesses the memory 110_4 through the memory controller 160_4. In other words, each of the display processing cores 120_1 to 120_4 is configured to access only one of the memories 110_1 to 110_4.

In more detail, the display processing core 110_1 may read the frame segment IB1 from the memory 110_1 through the data reading circuit prc_1 and record the frame segment IB1 to the line buffer LB1. The display processing core 110_2 may read the frame segment IB2 from the memory 110_2 through the data reading circuit prc_2 and record the frame segment IB2 to the line buffer LB1. Similarly, the display processing core 110_3 may read the frame segment IB3 from the memory 110_3 through the data reading circuit prc_3 and record the frame segment IB3 to the line buffer LB1. The display processing core 110_4 may read the frame segment IB4 from the memory 110_4 through the data reading circuit prc_4 and record the frame segment IB4 to the line buffer LB1. In general, the display processing cores 120_1 to 120_4 may respectively read of pixels of different parts of a reconstructed frame generated through the decoding of the decoding processing cores 130_1 to 130_4 from the memories 110_1 to 110_4, and write the read pixels into the line buffer LB1. Then, the display processing cores 120_1 to 120_4 may obtain pixel data from the line buffer LB1 to perform image processing. In this way, the display processing cores 120_1 to 120_4 may directly access the memories 110_1 to 110_4, without having to access through the system bus 200.

In addition, the above description is based on the example of four frame segments, four memories, four display processing cores, and four decoding processing cores, but those with ordinary skill in the art should be able to easily deduce/derive examples of other numbers after referring to FIGS. 1 to 5 and the above examples. Thus, details in this regard will not be further reiterated in the following.

Figure 7:
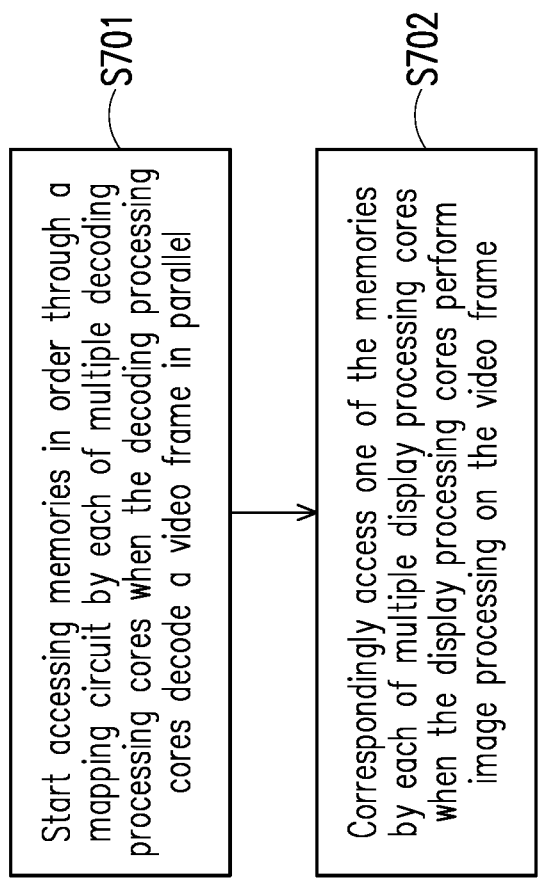
FIG. 7 is a flowchart of a memory accessing method according to an embodiment of the disclosure.

FIG. 7 is a flowchart of a memory accessing method according to an embodiment of the disclosure. In addition, sufficient teachings, suggestions, and embodiments concerning relevant implementation details and device features of the memory accessing method of this embodiment may be gained from the above descriptions in the embodiments of FIGS. 1 to 6 Therefore, the same details will not be repeated in the following.

In step S701, when the decoding processing cores decode the video frames in parallel, each of the decoding processing cores starts accessing the memories in order through the mapping circuit. In step S702, when the display processing cores perform image processing on the video frame, each of the display processing cores correspondingly accesses one of the memories. Herein, the memories are configured to record the frame segments of the video frame, and each of the memories correspondingly records one of the frame segments.

Based on the above, in the embodiments of the disclosure, with the parallel operation of the decoding processing cores and the display processing cores, the processing performance of the video decoding and display system may be facilitated. The decoding processing cores and the display processing cores do not access the memory through the system bus, so the burden of the system bus and the complexity of arbitration may be reduced. In addition, when decoding the video frame, the decoding processing cores are activated in order and may start accessing the memories in order through the mapping circuit, so as to reduce the probability of the decoding processing cores accessing the same memory simultaneously. In this way, the memory bandwidths of these memories may be used efficiently and evenly to facilitate the decoding performance. In addition, the display processing cores respectively use the memory bandwidths of different memories, so that the memory bandwidths of these memories may be used evenly. Accordingly, the image processing performance is facilitated. In this way, the embodiment of the disclosure may satisfy the computing performance of the display processing core and the decoding processing core, thereby facilitating the data accessing performance.

Although the disclosure has been described with reference to the above embodiments, it will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:
1. A video decoding and display system, comprising:
a plurality of memories, configured to record a plurality of frame segments of a video frame;
a plurality of memory controllers, wherein each of the memory controllers is correspondingly coupled to one of the memories, and the memory controllers comprise a first memory controller and a second memory controller,
wherein the memories comprise a first memory and a second memory, the first memory is coupled to the first memory controller and configured to record one of frame segments of the video frame, and the second memory is coupled to the second memory controller and configured to record another one of frame segments of the video frame,
wherein the frame segments comprise a first frame segment and a second frame segment, and the first frame segment recorded in the first memory comprises a plurality of first CTUs in a first row of coding tree units, and the second frame segment recorded in the second memory comprises a plurality of second CTUs in the first row of coding tree units;
a plurality of display processing cores;
a plurality of decoding processing cores, decoding the frame segments in parallel; and
a mapping circuit, coupled between the decoding processing cores and the memory controllers, wherein the decoding processing cores comprise a first decoding processing core;

wherein each of the memories correspondingly records one of the frame segments, each of the display processing cores correspondingly accesses one of the memories, each of the decoding processing cores accesses the memories through the mapping circuit, and each of the decoding processing cores accesses all of the memories through the memory controllers in order, wherein the first decoding processing core access the first memory through the first memory controller and the second memories through the second memory controller in sequence to decode the first CTUs in the first row of coding tree units in the first frame segment recorded in the first memory and to decode the second CTUs in the first row of coding tree units in the second frame segment recorded in the second memory.

2. The video decoding and display system according to claim 1, the decoding processing cores comprise a second decoding processing core,
wherein when the decoding processing cores decode the video frame, the first decoding processing core accesses the memories in order through the memory controllers, the second decoding processing core accesses the memories in order through the memory controllers, the first decoding processing core accesses one of the memories in a first period, and the second decoding processing core accesses another one of the memories in the first period.

3. The video decoding and display system according to claim 2, wherein the decoding processing cores are activated in order so as to decode a plurality of rows of coding tree units of the video frame, and each of the frame segments comprises some coding tree units of each of the rows of coding tree units,
wherein the first decoding processing core accesses one of the memories to decode a plurality of coding tree units belonging to an ith row of coding tree units in one of the frame segments, and the second decoding processing core simultaneously accesses another one of the memories to decode a plurality of coding tree units belonging to an $(i+1)^{th}$ row of coding tree units in another one of the frame segments.

4. The video decoding and display system according to claim 3, wherein when the first decoding processing core accesses the one of the memories to decode the coding tree units belonging to the $i^{th}$ row of coding tree units in the one of the frame segments, the mapping circuit sends an accessing request of the first decoding processing core to one of the memory controllers according to a memory identifier of the accessing request of the first decoding processing core; and
when the second decoding processing core accesses the another one of the memories to decode the coding tree units belonging to the $(i+1)^{th}$ row of coding tree units in the another one of the frame segments, the mapping circuit sends an accessing request of the second decoding processing core to another one of the memory controllers according to a memory identifier of the accessing request of the second decoding processing core.

5. The video decoding and display system according to claim 2, wherein when the first decoding processing core and the second decoding processing core simultaneously access one of the memories in a second period, the mapping circuit arbitrates an accessing request of the first decoding processing core and an accessing request of the second decoding processing core.

6. The video decoding and display system according to claim 1, further comprising a plurality of memory controllers coupled to the mapping circuit, wherein each of the memory controllers is correspondingly coupled to one of the memories, and the display processing cores comprise a first display processing core and a second display processing core,
wherein when the display processing cores perform image processing on the video frame, the first display processing core accesses one of the memories through one of the memory controllers, and the second display processing core accesses another one of the memories through another one of the memory controllers.

7. The video decoding and display system according to claim 1, further comprising a line buffer coupled to the display processing cores and a plurality of data reading circuits respectively and correspondingly coupled to the display processing cores, wherein the first display processing core reads one of the frame segments from one of the memories through one of the data reading circuits and records the one of the frame segments to the line buffer, and the second display processing core reads another one of the frame segments from another one of the memories through another one of the data reading circuits and records the another one of the frame segments to the line buffer.

8. A memory accessing method of a video decoding and display system, the memory accessing method comprising:
accessing a plurality of memories through a mapping circuit and a plurality of memory controllers by each of a plurality of decoding processing cores when the decoding processing cores decode a video frame in parallel, wherein each of the decoding processing cores accesses all of the memories in order, each of the memory controllers is correspondingly coupled to one of the memories, and the memory controllers comprise a first memory controller and a second memory controller; and
correspondingly accessing one of the memories by each of a plurality of display processing cores when the display processing cores perform image processing on the video frame,
wherein the memories are configured to record a plurality of frame segments of the video frame, and each of the memories correspondingly records one of the frame segments,
wherein the memories comprise a first memory and a second memory, the first memory is coupled to the first memory controller and configured to record one of frame segments of the video frame, and the second memory is coupled to the second memory controller and configured to record another one of frame segments of the video frame,
wherein the frame segments comprise a first frame segment and a second frame segment, and the first frame segment recorded in the first memory comprises a plurality of first CTUs in a first row of coding tree units, and the second frame segment recorded in the second memory comprises a plurality of second CTUs in the first row of coding tree units,
wherein the decoding processing cores comprise a first decoding processing core, the first decoding processing core access the first memory through the first memory controller and the second memories through the second memory controller in sequence to decode the first CTUs in the first row of coding tree units in the first frame segment recorded in the first memory and to decode the second CTUs in the first row of coding tree units in the second frame segment recorded in the second memory.

9. The memory accessing method according to claim 8, wherein the decoding processing cores comprise a second decoding processing core, and accessing the memories through the mapping circuit by each of the decoding processing cores when the decoding processing cores decode the video frame in parallel comprises:

when the decoding processing cores decode the video frame in parallel, accessing the memories in order through the memory controllers by the first decoding processing core, and accessing the memories in order through the memory controllers by the second decoding processing core, wherein the first decoding processing core accesses one of the memories in a first period, and the second decoding processing core accesses another one of the memories in the first period.

10. The memory accessing method according to claim 9, further comprising:

activating the decoding processing cores in order so as to decode a plurality of rows of coding tree units, wherein each of the frame segments comprises some coding tree units of each of the rows of coding tree units, wherein accessing the memories in order through the memory controllers by the first decoding processing core and the second decoding processing core comprises:

accessing one of the memories by the first decoding processing core to decode a plurality of coding tree units belonging to an $i^{th}$ row of coding tree units in one of the frame segments, and simultaneously accessing another one of the memories to decode a plurality of coding tree units belonging to an $(i+1)^{th}$ row of coding tree units in another one of the frame segments.

11. The memory accessing method according to claim 9, wherein starting accessing the memories in order through the mapping circuit by each of the decoding processing cores when the decoding processing cores decode the video frame in parallel further comprises:

arbitrating an accessing request of the first decoding processing core and an accessing request of the second decoding processing core by the mapping circuit when the first decoding processing core and the second decoding processing core simultaneously access one of the memories in a second period.

12. The memory accessing method according to claim 8, wherein the display processing cores comprise a first display processing core and a second display processing core, and correspondingly accessing one of the memories by each of the display processing cores when the display processing cores perform image processing on the video frame comprises:

when the display processing cores perform image processing on the video frame, accessing one of the memories through one of the memory controllers by the first display processing core, and accessing another one of the memories through another one of the memory controllers by the second display processing core.

* * * * *